March 4, 1941.                F. COOK                2,233,994
AUTOMATIC HYDRAULIC BRAKE ATTACHMENT
Filed Oct. 10, 1940          2 Sheets-Sheet 2
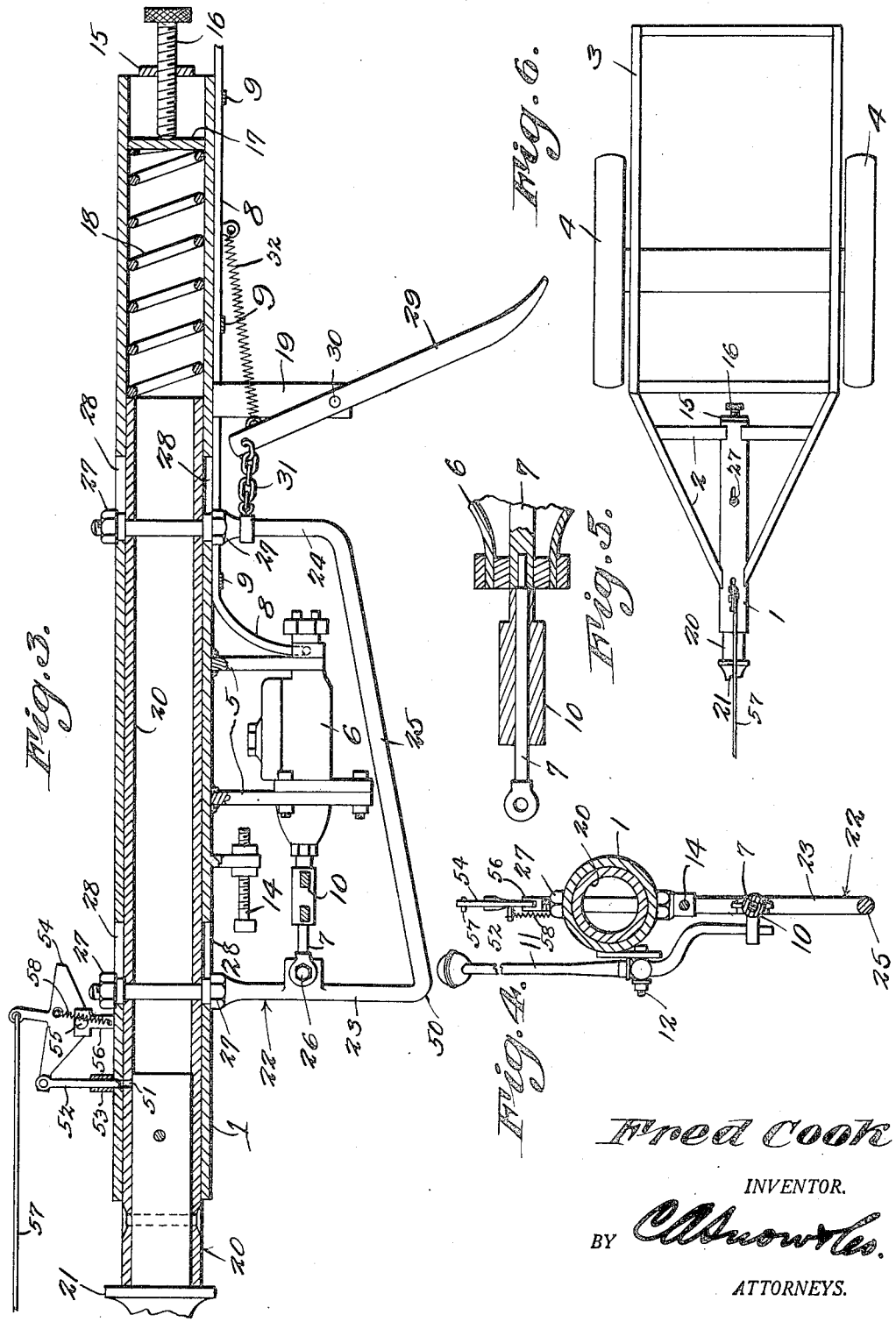
Fred Cook
INVENTOR.
BY Knowles
ATTORNEYS.

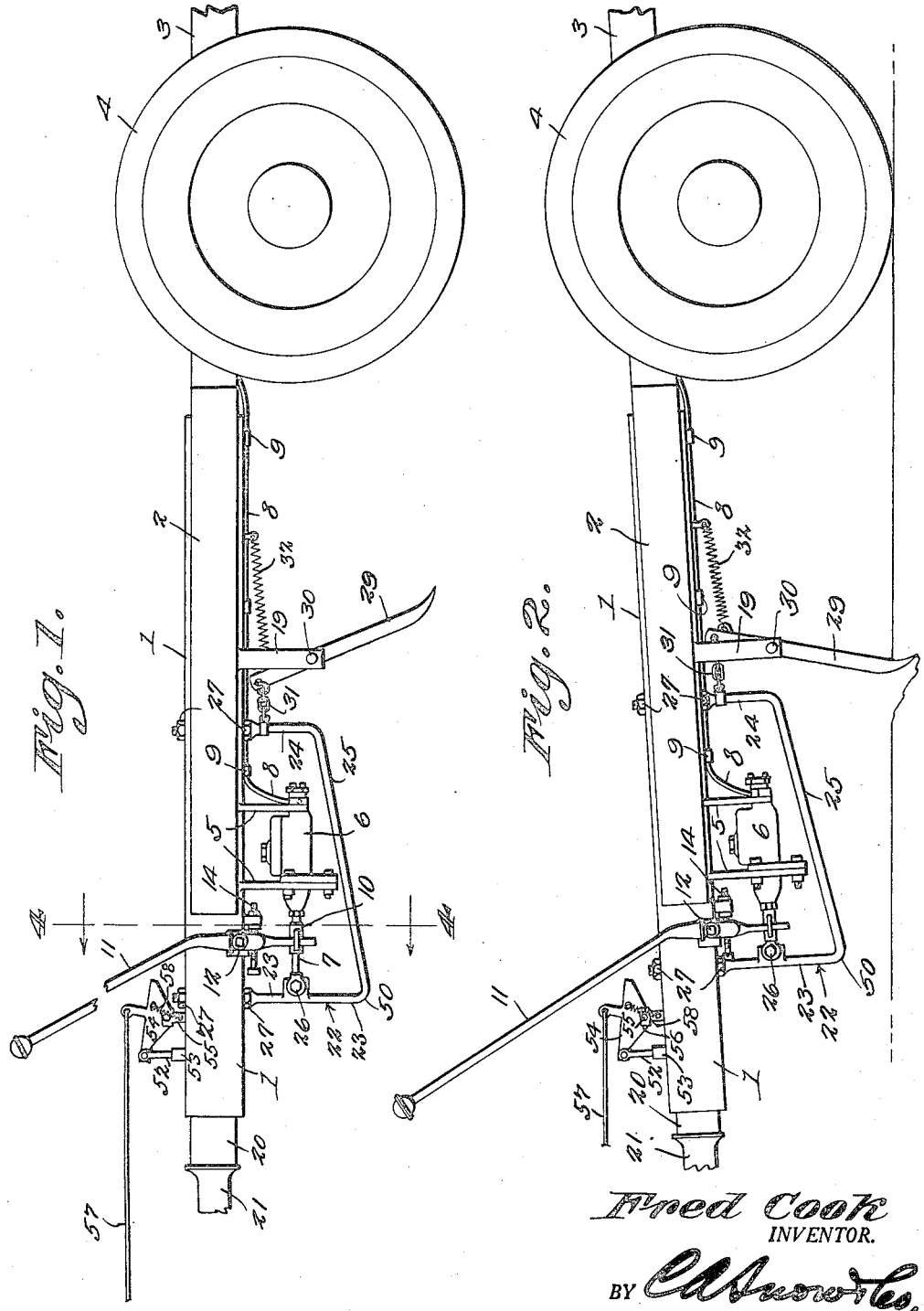

Patented Mar. 4, 1941

2,233,994

UNITED STATES PATENT OFFICE 2,233,994

AUTOMATIC HYDRAULIC BRAKE ATTACHMENT

Fred Cook, San Diego, Calif.

Application October 10, 1940, Serial No. 360,656

5 Claims. (Cl. 188—112)

This invention has among its objects the provision of novel means whereby the brakes on a trailer will be set automatically, if the trailer breaks loose from the towing instrumentality, and starts to move forwardly and down hill or forwardly by inertia, or backwardly and down hill. The word "trailer" is to be construed to mean a vehicle of any sort which is being towed.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings forming part of this application:

Fig. 1 shows, in side elevation, a device constructed in accordance with the invention, parts being broken away and the trailer being shown in normal, towed position;

Fig. 2 is a side elevation showing the parts as they will appear when the trailer, having broken loose, moves backwardly by inertia or because of the downward and backward inclination of the ground;

Fig. 3 is a longitudinal section on an enlarged scale;

Fig. 4 is a transverse section on the line 4—4 of Fig. 1;

Fig. 5 is a fragmental longitudinal section showing the forward end of the master brake cylinder and attendant parts;

Fig. 6 is a diagrammatic top plan showing a trailer equipped with the device forming the subject matter of this application.

The numeral 1 designates a tubular slide, connected by braces 2 to the forward end of a towed vehicle 3, having ground wheels 4. Since the specific form of the towed vehicle 3 may be changed as occasion may require, the vehicle has been shown as of the simplest construction.

Depending hangers 5 are secured to the slide 1 and carry a master brake cylinder 6, wherein a piston 7 is mounted for reciprocation. A conduit 8, attached at 9 to the slide 1, leads rearwardly from the cylinder 6. The conduit 8 functions to actuate, in a well known manner, brake mechanisms (not shown) but of any standard or approved construction, those mechanisms retarding the rotation of the ground wheels 4 of the vehicle 3.

A yoke 10 is secured to the piston rod 7 of the master brake cylinder 6, and in the yoke the lower end of a hand lever 11 is pivotally received. The lever 11 is fulcrumed at 12 on the slide 1. The lever 11 is typical of any instrumentality, under the control of an operator, for setting the brakes (not shown) which coact with the wheels 4 of the towed vehicle.

A cross piece 15 is fixedly mounted on the rear end of the slide 1, and into the cross piece is threaded a screw 16, constituting a spring adjuster. The screw 16 bears against an abutment 17, mounted to reciprocate in the slide 1. The abutment 17 engages a compression spring 18 disposed within the slide 1. A depending bracket 19 is fixed on the slide 1, adjacent to the rear end thereof. The slide 1 is mounted to reciprocate on a guide or draft tongue 20, carrying, at its forward end, a draft hitch 21. The compression spring 18 engages the rear end of the guide 20.

The numeral 22 designates a depending frame, including a forward arm 23, a rear arm 24 and an upwardly and rearwardly inclined base 25 connecting the lower ends of the arms. The parts 23 and 25 define an acute toe 50 at the lower, forward corner of the frame 22. The toe of the frame 22 is adapted to rest on the ground and to support the trailer when the trailer is not being towed, but it has another function, which will be made manifest hereinafter. The forward end of the piston 7 of the master brake cylinder 6 is attached as indicated at 26 to the forward arm 23 of the frame 22.

The forward arm 23 and the rear arm 24 of the frame 22 pass through the guide or draft tongue 20 and are secured thereto as shown at 27. The slide 1 is provided with longitudinal slots 28, receiving the arms 23—24 of the frame 22, and permitting the slide 1 to move forwardly and backwardly, to a limited extent, with respect to the guide or draft tongue 1.

The slide 1 is equipped with a downwardly-extended ear, carrying a longitudinally-adjustable stop 14, preferably a screw, held in adjusted positions by nuts. The stop 14 is located directly to the rear of the forward arm 23 of the frame 22, and is adapted to coact therewith under conditions which will be pointed out hereinafter.

A ground-engaging drag lever or soil-engaging member 29 is fulcrumed intermediate its ends, as indicated at 30, on the downwardly-extended bracket 19 which is fixed to the slide 1. A flexible connection 31, for example a chain, is attached to the upper end of the drag lever 29 and to the rear arm 24 of the frame 22. A retractile spring 32 is connected to the member 1 and to the upper end of the drag lever 29, above the fulcrum 30 of the drag lever.

A means is provided whereby it will be possible to back the towed vehicle without setting the brakes thereon. With that end in view, the tongue or guide 20 and the slide 1 are provided with openings 51, wherein a latch pin 52 is mounted for reciprocation, the latch pin being received in a guide cuff 53 on the slide 1.

The latch pin 52 is operated by any appropriate means, for instance a bell crank 54, whereunto the latch pin 52 is pivoted, the bell crank being fulcrumed at 55 on a standard 56 carried by the slide 1.

The bell crank 54 is actuated by a rigid connection 57 pivoted thereunto, and extended forwardly to a place accessible to an operator. The upper end of a retractile spring 58 is secured to the bell crank 54, the lower end of the spring being secured to the standard 56 or anchored otherwise. The spring 58 is so related to the fulcrum 55 of the bell crank 54 that the spring will hold the latch pin 52 advanced or retracted. Owing to the simplicity of the structure under discussion, a description of its operation seems unnecessary.

By manipulating the hand lever 11, the piston 7 is moved backwardly in the master brake cylinder 6, and the brakes are set on the ground wheels 4 of the towed vehicle 3.

If the brakes on the towing vehicle (not shown) are set suddenly, the towed vehicle 3 moves forwardly by inertia, advancing the slide 1 and compressing the cushioning spring 18, the master cylinder 6 moving forwardly, and the brakes being set on the wheels 4 of the towed vehicle.

If the towed vehicle 3 becomes disconnected from the towing vehicle and moves backwardly down hill, the lower end of the drag lever 29 engages the roadway as depicted in Fig. 2, the tongue 20 and the frame 22 are carried backwardly, the piston 7 moves backwardly in the master cylinder 6, and the brakes are set on the wheels 4 of the towed vehicle.

If the towed vehicle 3 becomes disconnected from the towing vehicle and moves forwardly, either down hill or by inertia, the toe 50 of the frame 22 engages the roadway, and the inertia of the towed vehicle causes it to move forwardly, carrying forwardly the cylinder 6, the brakes being set on the wheels 4 of the towed vehicle, movement of the cylinder 6 relatively to the frame 22 resulting in a setting of the brakes.

The stop 14 is adapted to engage the forward arm 23 of the frame 22, and the rearward movement of the slide 20 and associated parts is stopped at the corresponding termination of the stroke of the piston 7, should there be an abnormal diminution of pressure in the cylinder 6, to the right of the piston head, due to wear or other cause.

The device forming the subject matter of this application operates automatically, and gives brake attention to the towed vehicle. The pressure exerted by the spring 18 may be regulated through the instrumentality of the part 16 of Fig. 1, brake effort being adjusted accordingly.

The structure is void of complicated parts and will be found effective to consummate the objects and advantages hereinbefore set forth.

What is claimed is:

1. In a brake attachment for towed vehicles, a tongue and a slide telescoped for relative longitudinal movement, a compression spring exerting pressure in opposite directions on the rear portion of the tongue and the rear portion of the slide, a depending, soil-engaging frame fixed in the tongue and engageable with the slide to limit relative longitudinal movement between the tongue and the slide, a brake cylinder carried by the slide, a piston movable in the cylinder and connected to the frame, a movable soil-engaging member located to the rear of the frame and carried by the slide, and means for effecting a connection between the soil-engaging member and the slide.

2. A brake attachment for towed vehicles, constructed as set forth in claim 1, in combination with means for adjusting the effort of the spring at the will of an operator.

3. A brake attachment for towed vehicles, constructed as set forth in claim 1, in combination with interacting parts on the slide and on the frame, cooperating to determine forward movement of the slide relatively to the tongue and relative movement between the cylinder and the piston.

4. In a brake attachment for towed vehicles, a tongue and a slide telescoped for relative longitudinal movement, a compression spring exerting pressure in opposite directions on the rear portion of the tongue and the rear portion of the slide, a depending, soil-engaging frame fixed on the tongue and engaged with the slide to limit relative longitudinal movement between the tongue and the slide, a brake cylinder carried by the slide, a piston movable in the cylinder and connected to the frame, a soil-engaging lever, means for fulcruming the lever intermediate its ends on the slide, a forwardly-extended flexible connection joining the upper portion of the lever with the frame, and a rearwardly-extended retractile spring connecting the upper portion of the lever with the slide.

5. A brake attachment for towed vehicles, constructed as set forth in claim 1, in combination with means under the control of an operator for interlocking the slide and the tongue against relative longitudinal movement.

FRED COOK.